United States Patent
Hakala et al.

(10) Patent No.: US 7,436,942 B2
(45) Date of Patent: Oct. 14, 2008

(54) SYSTEM AND METHOD FOR CHARGING IN A COMMUNICATION NETWORK

(75) Inventors: Harri Hakala, Turku (FI); Johan Lundström, Pargas (FI); Patrik Teppo, Jämsjö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 498 days.

(21) Appl. No.: 10/496,181

(22) PCT Filed: Nov. 21, 2002

(86) PCT No.: PCT/FI02/00942

§ 371 (c)(1), (2), (4) Date: May 9, 2005

(87) PCT Pub. No.: WO03/045044

PCT Pub. Date: May 30, 2003

(65) Prior Publication Data

US 2005/0213721 A1    Sep. 29, 2005

(30) Foreign Application Priority Data

Nov. 21, 2001   (FI) .................................. 20012277

(51) Int. Cl.
*H04M 15/00* (2006.01)
*H04M 11/00* (2006.01)
*H04L 12/66* (2006.01)

(52) U.S. Cl. ..................... 379/114.22; 379/114.21; 370/352; 455/406

(58) Field of Classification Search ............ 379/114.01, 379/114.02–114.09, 114.21, 114.22, 114.23, 379/122; 455/405–408; 370/352, 493
See application file for complete search history.

(56) References Cited

U.S. PATENT DOCUMENTS

| 5,793,854 | A | * | 8/1998 | Kashepava ................. 379/130 |
| 5,978,456 | A | | 11/1999 | Takeuchi et al. |
| 6,263,058 | B1 | | 7/2001 | Lautenschlager et al. |
| 6,278,874 | B1 | | 8/2001 | Verdonk |

(Continued)

FOREIGN PATENT DOCUMENTS

EP    0808073 A    11/1997

(Continued)

OTHER PUBLICATIONS

3 GPP TR 23.815 VO. 2.0.; "Charging Implications of IMS Architecture (Release 5)"; 3rd Generation Partnership Project; Technical Specification Group Services and System Aspects, [Online], Nov. 20, 2001, XP002237395. Retrieved form the Internet: URL:http://www.3.gpp.org-/ftp/Specs/archive/23_series/23.815.

(Continued)

*Primary Examiner*—Quoc D Tran
(74) *Attorney, Agent, or Firm*—Nixon & Vanderhye, P.C.

(57) ABSTRACT

The present invention relates in general to communication networks and more specifically to a system and a method for charging in a communication network, especially in an IP Multimedia network. The new charging system allows charging principles used in traditional telecom networks to be applied also in IP Multimedia networks.

51 Claims, 4 Drawing Sheets

U.S. PATENT DOCUMENTS

| | | | |
|---|---|---|---|
| 6,373,931 B1 * | 4/2002 | Amin et al. | 379/121.01 |
| 7,257,209 B2 * | 8/2007 | Gruchala et al. | 379/127.01 |
| 2002/0094800 A1 * | 7/2002 | Trop et al. | 455/406 |
| 2004/0087299 A1 * | 5/2004 | Vallinen et al. | 455/405 |

FOREIGN PATENT DOCUMENTS

| | | | |
|---|---|---|---|
| EP | 1014619 A | 6/2000 |
| EP | 1094659 A | 4/2001 |
| GB | 2342006 A | 3/2000 |
| WO | 94/28670 A | 12/1994 |
| WO | WO 94/28670 | * 12/1994 |
| WO | 98/21676 A1 | 6/1998 |
| WO | 99/65183 A3 | 12/1999 |
| WO | 00/67459 A | 11/2000 |
| WO | 01/91445 A1 | 11/2001 |

OTHER PUBLICATIONS

International Preliminary Examination Report of PCT/FI02/00942 filed Nov. 21, 2002.

International Search Report of PCT/FI02/00942 filed Nov. 21, 2002.

* cited by examiner

SYSTEM AND METHOD FOR CHARGING IN A COMMUNICATION NETWORK

This application is the U.S. national phase of international application PCT/FI02/00942 filed in English on 21 Nov. 2002, which designated the US. PCT/FI02/00942 claims priority to FI Application No. 20012277 filed 21 Nov. 2001. The entire contents of these applications are incorporated herein by reference.

TECHNICAL FIELD OF THE INVENTION

The presently disclosed technology relates in general to communication networks and more specifically to a system and a method for charging in a communication network, especially in an IP Multimedia network.

BACKGROUND OF THE INVENTION

The background of the invention is discussed briefly in the following.

3GPP specifies a new architecture for IP Multimedia (3GPP, Third Generation Partnership Project; IP, Internet Protocol). IP Multimedia will offer subscribers new services like video-calls and conferences, but also traditional services like speech calls will be an important feature. The technology is based on SIP (SIP, Session Initiation Protocol).

A prerequisite for IP Multimedia services to become popular among end users and profitable to the operators is to find a fair and efficient way of charging for the offered services. This is however not easy, due to the new technology and architecture, which is fundamentally different compared to traditional telecom networks.

In traditional telecom networks, the distance between the involved parties, and the used access types e.g. mobile access or fixed access, has a significant influence on the tariff of a service. It is also customary that the calling party pays for a call, at least to the point in the network, which can be identified by the called party's number e.g. E.164 number.

In some countries, like the US, mobile subscribers have to pay for the access part i.e. airtime of a call, also when receiving a call. However, this charging model has proved to be less efficient than a model where the calling party pays for the whole call, since called subscribers often refuse to accept incoming calls if they have to pay for them.

When allowing charging models like the calling party A pays for the call some communication between the networks (e.g. originating, terminating and in some cases transit networks) is needed. In mobile communication networks one can see on the number where one is calling and in some cases one can see if the called party is a mobile or a fix user. Rating/charging for the calling party is done in his/her home network and the charging/billing system can see the destination of the call on the called party number and can rate the call accordingly. The terminating network will then charge the originating network for terminating the call. This charging process is done from the terminating network to the originating network via the transit networks.

In an IP-based multimedia system (IMS) there is no possibility to see on the called party what access type, for example fixed/mobile, the called party is using and thus the call/session can not be rated without knowing the cost for the terminating network to terminate the call. In this case home network of the called party has to check with home network of the calling party if it would like to take the charge for termination the call/session and the tariff/cost for it.

For free phone numbers or premium rate numbers the same problem applies. In these cases the called party is charged for the whole call or parts of the calls. In this case must the home network of the called party contact the home network of the calling party and indicate that the called party is willing to take the charges or a part of the charges.

The communication between the home networks need to be done on a new interface or on an existing interface dedicated for charging.

Future operators of IP Multimedia networks have indicated that they want to follow the same charging principles as in traditional telecom networks, e.g. calling party pays for the whole call and the charging is dependent on access type. According to legislation in most countries, it's not possible to charge for a service, if it's not possible for a subscriber to know the tariff of the service prior to usage.

It will be especially challenging to charge for IP Multimedia sessions, since it will be impossible for a calling party to determine based on the called party address, i.e. a SIP URL (e.g. Johan.Lundstrom@company.com), the distance and the access type currently used by the called party. Even though operators may in the future not charge based on the distance anymore, the access type will certainly have an impact on the charging, since some access types, for example mobile, will always be more costly for the operators to provide than others.

SUMMARY OF THE PRESENT DISCLOSURE

It is an object of on one or more non-limiting embodiments of the present invention to overcome or at least mitigate the disadvantages of the prior art. The disclosure provides a system and a method for charging in a communication network.

According to a first non-limiting aspect of the disclosure, a system provided for charging in a communication network, the communication network having a user equipment and an IP Multimedia subsystem, the IP Multimedia subsystem having a Proxy-CSCF and a Serving-CSCF, in which the IP Multimedia subsystem further having an location server and a charging server, and that the Serving-CSCF is arranged
  for receiving a call/session set-up request message,
  for asking the relevant location information of the called user from the Location Server, and
  for asking tariff information for the called user in the relevant locations from a Charging Server.

Preferably, the Serving-CSCF is arranged for creating a dynamic tariff list. More preferably, the Serving-CSCF is arranged for sending the dynamic tariff list to a user equipment. More preferably, the user equipment is arranged for sending the call/session set-up request message as for setting up an IP Multimedia call/session.

Preferably, the call/session set-up request message of the user equipment is made by sending an INVITE message. Alternatively, the call/session set-up request message of the user equipment is made by using an OPTIONS method.

Preferably, the user equipment is arranged for receiving the dynamic tariff list. More preferably, the user equipment is arranged for displaying the dynamic tariff list to the user. More preferably, the user equipment is arranged for detecting selections of the user.

Preferably, the Serving-CSCF is arranged for sending the dynamic tariff list to a called party user equipment. More preferably, the called party user equipment is arranged for receiving the dynamic tariff list.

Preferably, the called party user equipment is arranged for displaying the dynamic tariff list to the user. More preferably, the called party user equipment is arranged for detecting the selections of the user.

Preferably, call/session cost is divided between the calling party and the called party. More preferably, the called party user equipment is arranged for sending a response to the calling party user equipment.

Preferably, the Serving-CSCF is arranged for negotiating the tariff with the Serving-CSCF. More preferably, the call/session cost is divided between the calling party and the called party. More preferably, the Serving-CSCF is arranged for sending the response to the calling party user equipment and to the called party user equipment.

Preferably, the user equipment is a mobile telephone, a personal computer, a personal digital assistant, a fixed telephone, or a smart phone.

According to a second non-limiting aspect of the disclosure, a system is provided for charging in a communication network, characterized in that the system has first user equipment for requesting a connection to second user equipment, for receiving a tariff list, means for choosing the format and media type of the connection, and for sending a new message to a network, wherein the message indicates the requested access type and/or media type of the connection; and a network for receiving request for connection between the first user equipment and the second user equipment, for determining costs according to the access types based on a location of the second user equipment, creating a tariff list, and sending the tariff list to the first user equipment.

Preferably, the location of the second user equipment is determined by a S-CSCF in a first home network. Preferably, the tariff list is created dynamically by the S-CSCF. Preferably, the user equipment is a mobile telephone, a personal computer, a personal digital assistant, a fixed telephone, or a smart phone.

According to a third non-limiting aspect of the disclosure, a method is provided for charging in a communication network, the communication network having a user equipment and an IP Multimedia subsystem, the IP Multimedia subsystem having a Proxy-CSCF and a Serving-CSCF, wherein the IP Multimedia subsystem further has an location server and a charging server, in which the method has the acts of:

the Serving-CSCF, receiving a call/session set-up request message, the Serving-CSCF, asking the relevant location information of the called user from the Location Server, and the Serving-CSCF, asking tariff information for the called user in the relevant locations from a Charging Server.

Preferably, in the method, the Serving-CSCF creates a dynamic tariff list. More preferably, the Serving-CSCF sends the dynamic tariff list to a user equipment. More preferably, the user equipment sends a call/session set-up request message as for setting up an IP Multimedia call/session.

Preferably, in the method, the call/session set-up request message of the user equipment is made by sending an INVITE message. Alternatively, the call/session set-up request message of the user equipment is made by using an OPTIONS method.

Preferably, in the method the user equipment receives a dynamic tariff list. More preferably, the user equipment displays the dynamic tariff list to the user. More preferably, the user equipment detects selections of the user.

Preferably, in the method, the Serving-CSCF sends the dynamic tariff list to a called party user equipment. More preferably, the called party user equipment receives a dynamic tariff list.

Preferably, in the method, the called party user equipment displays the dynamic tariff list to the user. More preferably, the called party user equipment detects the selections of the user.

Preferably, in the method, the call/session cost is divided between the calling party and the called party. More preferably, the called party user equipment sends a response to the calling party user equipment.

Preferably, in the method, the Serving-CSCF negotiates the tariff with the Serving-CSCF. More preferably, the call/session cost is divided between the calling party and the called party. More preferably, the Serving-CSCF sends one response to the calling party user equipment and to the called party user equipment.

According to a fourth non-limiting aspect of the disclosure, a method is provided for charging in a communication network, characterized in that the method comprises the acts of receiving an invite message or using an options method from the user equipment to the network;

checking where the called subscriber is currently registered;

determining in the network the costs based on each used access types;

creating a dynamic tariff list in the network;

sending the dynamic tariff list to the user equipment; and a user select one or several option for access type and/or media type.

Preferably, in the method, the user equipment sends a SIP invite message as a call/session set-up request. More preferably, the user equipment uses a SIP options method for requesting the call/session set-up.

Preferably, the method further comprises sending a new invite message from the user equipment to the network, wherein a chosen access type and/or media type is included in the message. Preferably, the dynamic tariff list is created and sent by a S-CSCF.

According to a fifth non-limiting aspect of the disclosure, a method is provided for charging cost determination in a communications system, in which the method comprises the acts of:

receiving from a first communications entity a connection set up request towards a subscriber, determining at least one location of said subscriber, for each of at the at least one location of the subscriber, determining the access costs towards the subscriber, returning to the first communications entity the access costs.

Preferably, after the acts of returning to the first communications entity the access costs, the further includes the acts of:

receiving a second connection set up request towards the second subscriber, based upon said the second connection set up request determining towards which location to set up the connection, and setting up the connection towards the location.

Preferably, the location of the subscriber is registered in the location server.

Preferably, the second connection set up request also indicates which quality of service, which media type and/or which access type to use. Preferably, the connection set up requests are done using SIP signalling. Preferably, the connection set up requests comprise using the SIP INVITE or SIP OPTIONS messages.

According to a sixth non-limiting aspect of the disclosure, a method is provided for distributing charging related information in a communication network, characterized in that the method comprises the acts of providing a tariff information for terminating a call from a first network to a second network;

accepting the tariff in the second network; and initiating at least one charging session when a calling party sets up a connection.

Preferably, the first network is a called party network and the second network is a calling party network. Alternatively, the first network is the calling party network and the second network is the called party network.

Preferably, a settlement between the networks is sent from a first operator in the first network to a second operator in the second network as a CDR (Call Detail Record).

BRIEF DESCRIPTION OF THE DRAWINGS

For a better understanding of the disclosure and in order to show how the same may be carried into effect reference will now be made to the accompanying drawings, in which.

DETAILED DESCRIPTION OF CERTAIN EMBODIMENTS

Figure 1:
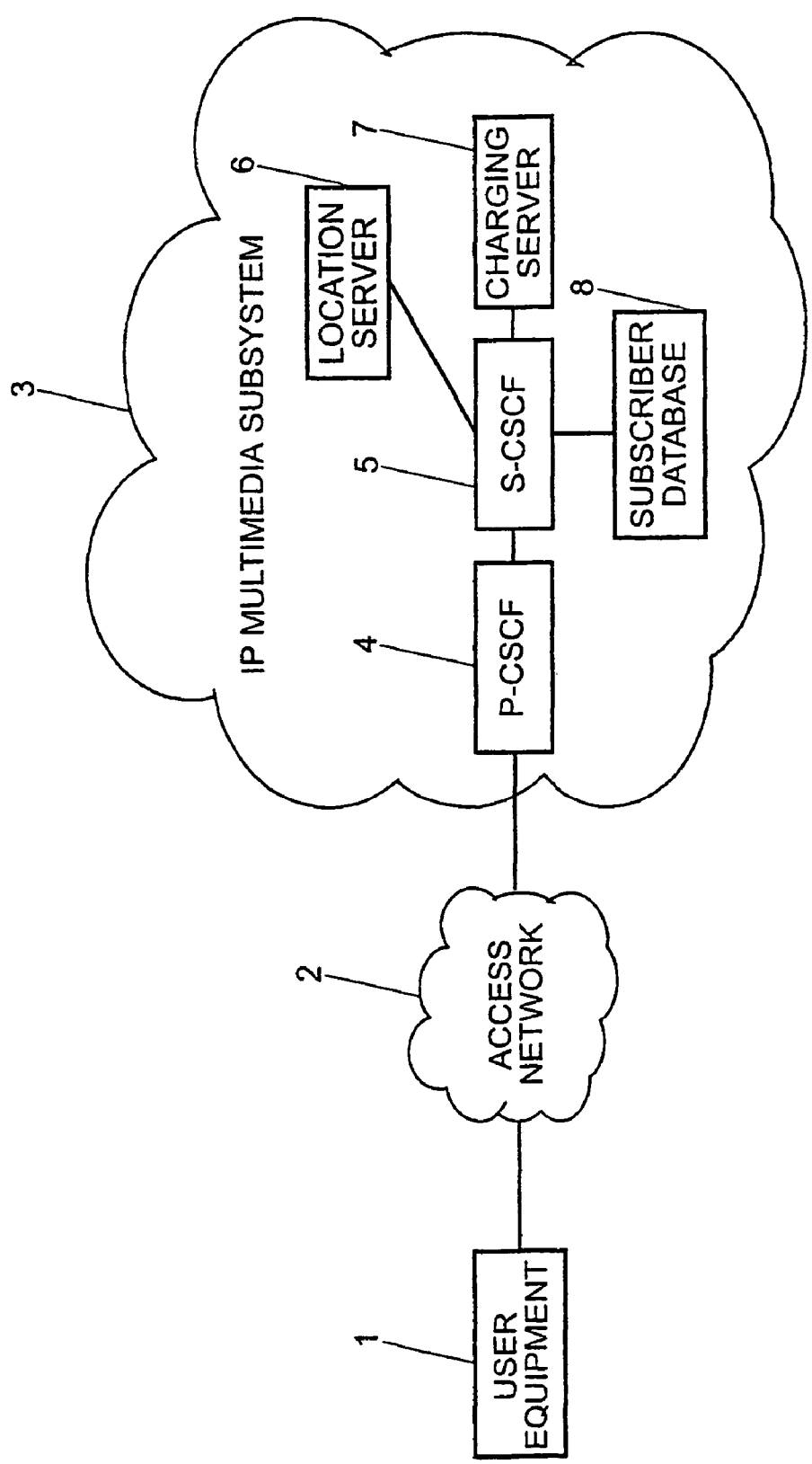
FIG. 1 illustrates a non-limiting example system for charging in a communication network according to the present invention.

FIG. 1 illustrates a non-limiting example system for charging in a communication network. The communication network charging system according to the present invention includes a user equipment 1, an access network 2, an IP Multimedia subsystem 3, a special SIP server known as the Proxy-CSCF (P-CSCF) 4 (CSCF, Call State Control Function), another special server known as the Serving-CSCF (S-CSCF) 5, a Location Server 6 e.g. a Domain Name Server 6, a Charging Server 7, and a Subscriber Database 8 among others.

In the communication network charging system, user equipment 1 asks service information in order to initiate a call to another user. This request from the user 1 is forwarded through the access network 2, e.g., a GPRS Network 2 or a WLAN Network 2, to the IP Multimedia subsystem 3, e.g. to IMS 3 (IMS, IP-based multimedia system). The IMS 3 receives the service information request in the Proxy-CSCF (P-CSCF) 4, which further forwards the request to the Serving-CSCF (S-CSCF) 5.

In the IP Multimedia subsystem 3 the Serving-CSCF (S-CSCF) 5 retrieves basic subscriber information from the subscriber database 8. The Serving-CSCF (S-CSCF) 5 also asks for the relevant location information of the called user from the Location Server 6. The Location Server 6 can be a Domain Name Server 6, HLR 6, HSS 6 or a positioning server 6 for example. Furthermore, the Serving-CSCF (S-CSCF) 5 asks for the tariff information for the called user in the relevant locations from the Charging Server 7. The locations of the user can e.g. be office, home or mobile phone.

A solution according to one or more non-limiting examples present a new system for charging in a communication network. This new charging system allows charging principles used in traditional telecom networks to be applied also in IP Multimedia networks.

Since the tariff of a specific IP Multimedia session cannot be known prior to establishment of the session, a call attempt to the called subscribers network 3 is made by, e.g., sending an INVITE message or using the OPTIONS method. The call attempt is handled in the called party's network 3 by the S-CSCF 5. The S-CSCF 5 checks from the Location Server 6 e.g., from a Domain Name Server 6 or from a location server 6, where the called subscriber is currently registered.

Figure 2:
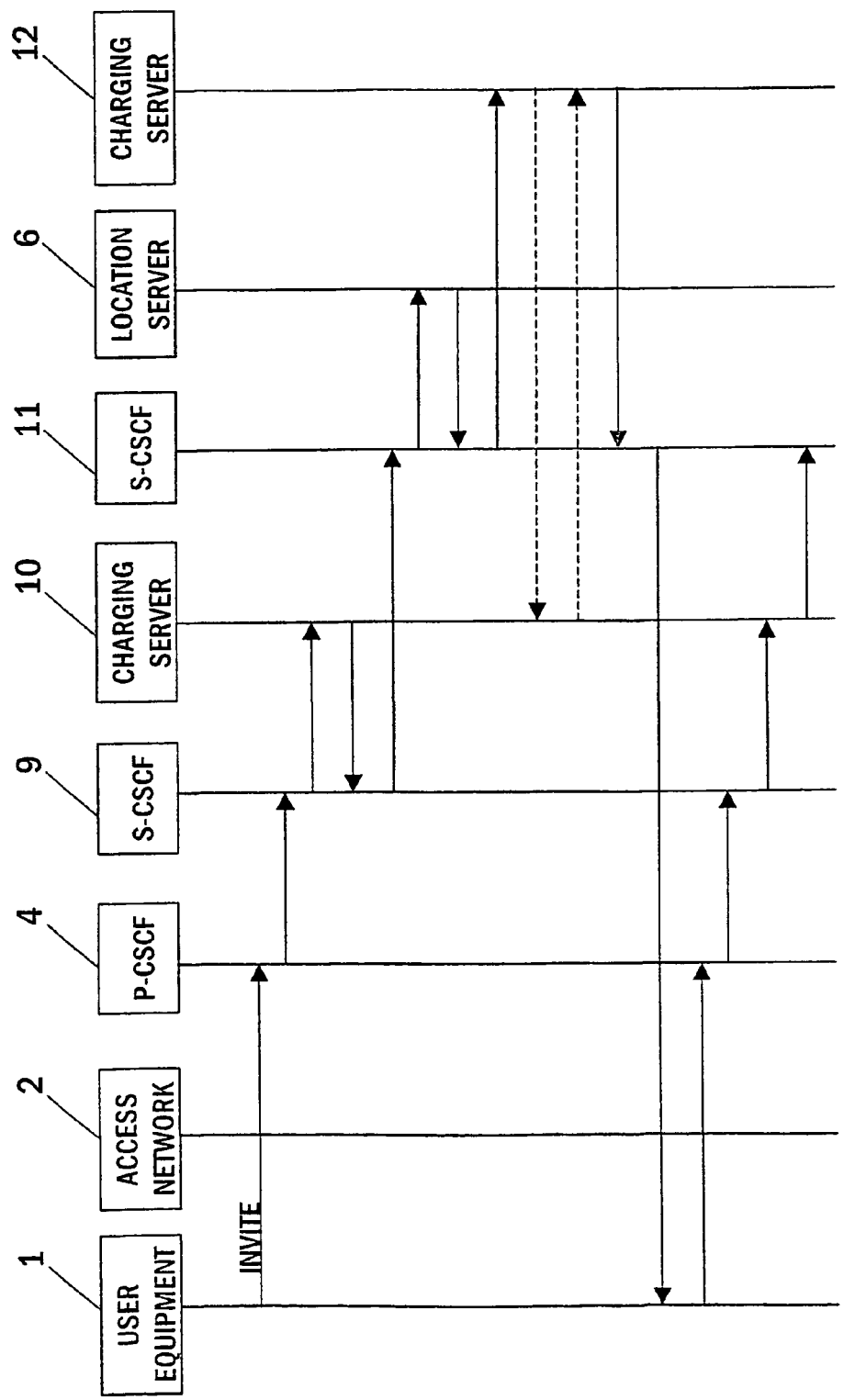
FIG. 2 illustrates a message sequence of non-limiting example method for charging in a communication network according to the present invention.

FIG. 2 illustrates a message sequence of an example method for charging in a communication network. In the communication network charging system, the user equipment 1 asks for service information in order to initiate a call to another user. This request from the user equipment 1 is forwarded through an access network 2, e.g., a GPRS Network 2 or a WLAN Network 2, to a Proxy-CSCF (P-CSCF) 4, which further forwards the request to the user's home network Serving-CSCF (S-CSCF) 9. User's home network Serving-CSCF (S-CSCF) 9 further forwards the request from the user equipment 1 to a called user's home network Serving-CSCF (S-CSCF) 11.

The called user's home network Serving-CSCF (S-CSCF) 11 asks for the relevant location information of the called user from a Location Server 6, e.g., a Domain Name Server 6. Furthermore the Serving-CSCF (S-CSCF) 11 asks for tariff information for the called user in the relevant locations from a Charging Server 12. The locations of the called user can, e.g., be office, home or mobile phone. The Serving-CSCF (S-CSCF) 9 may also ask for roaming tariff information from the Charging Server 10.

The Charging Server 12 then returns the tariff information for the called user in the relevant locations to the called user's home network Serving-CSCF (S-CSCF) 11. The S-CSCF 11 in turn forwards the tariff information for the called user in the relevant locations to the user equipment 1. As the user 1 selects correct number a new message e.g. INVITE message is sent to set up the call.

The tariff list is sent backwards to the originating end, via SIP signalling. This means that the S-CSCF works as a SIP redirecting server.

Figure 3:
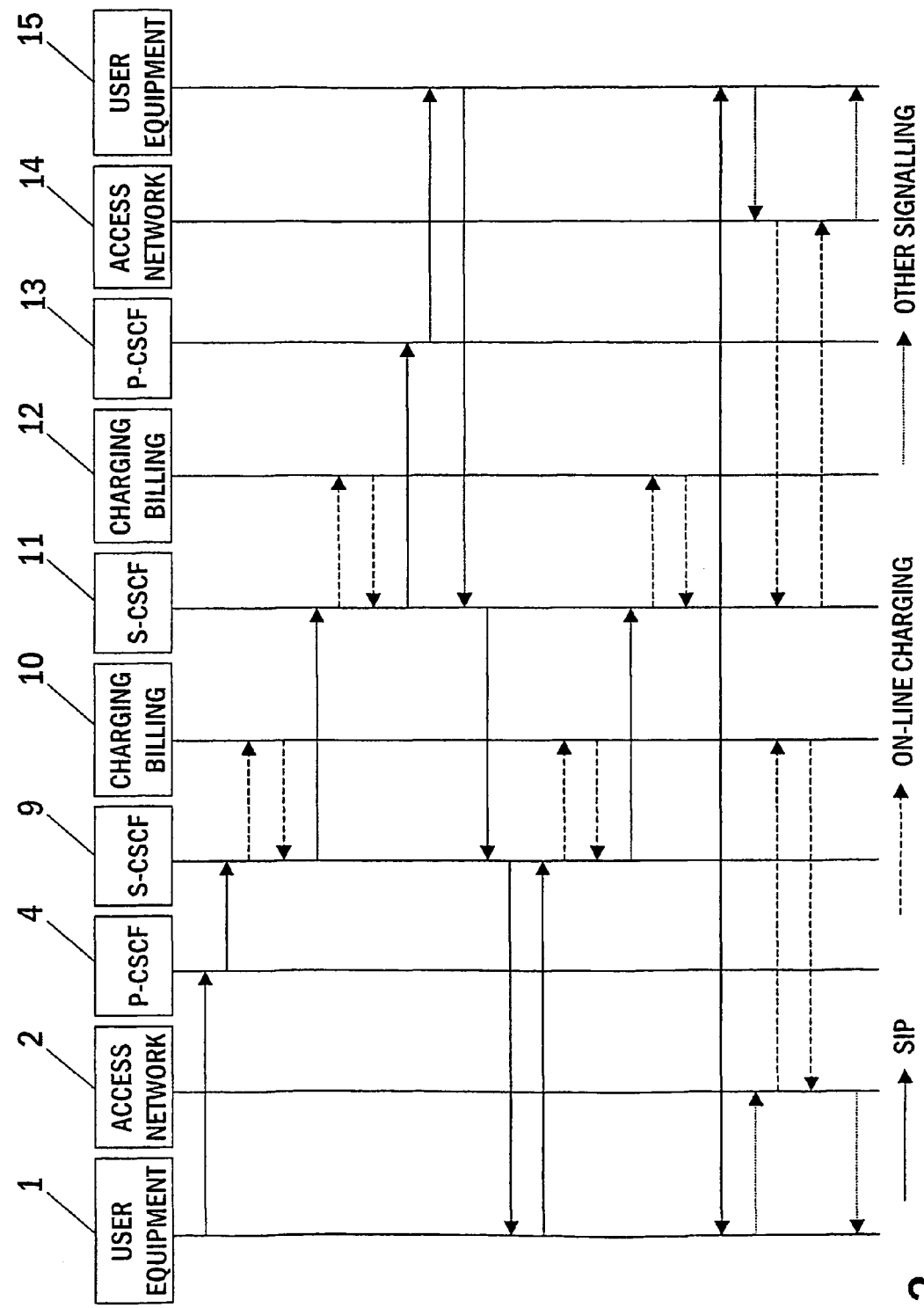
FIG. 3 illustrates a message sequence utilizing another non-limiting example method for charging in a communication network according to the present invention.

FIG. 3 illustrates another example of a call/session set-up in an IP Multimedia network. In the communication network charging system, Equipment 1 asks for service information in order to initiate a call to another user. This request from the User Equipment 1 is forwarded through an access network 2 e.g., a GPRS Network 2 or a WLAN Network 2, to an IP Multimedia network e.g. to IMS (IMS, IP-based multimedia sub-system. IMS receives the service information request in a Proxy-CSCF (P-CSCF) 4, which further forwards the request to a Serving-CSCF (S-CSCF) 9.

In the IP Multimedia network, the Serving-CSCF (S-CSCF) 9 performs charging negotiation with a Charging Server 10. S-CSCF 9 will get information about access type (e.g. GSM, WCDMA, WLAN, fixed line, etc.). At this time of the call/session set-up, the Charging Server 10 will not know which tariff to use for the calling party so the call/session set-up will continue. The S-CSCF 9 will create a dynamic tariff list and insert the tariff for the originating leg according to the access type the calling party uses. S-CSCF asks the relevant location information of the called user from a Domain Name Server or similar.

The S-CSCF 9 in the calling party's home network will forward the call/session Set-up request to the S-CSCF 11 in the called party's home network on the information gotten from the Domain Name Server.

The S-CSCF 11 in the called party's home network will perform charging with the charging server 12. The S-CSCF 11 will get back information about access type used by the called party, but the tariff to be used for the called party can not be determined yet. The S-CSCF 11 will add the tariff for the terminating leg to the dynamic tariff list.

The call/session set-up request will be sent to the called party's User Equipment 15 via the P-CSCF 13 and an access network 14.

The called party can then decide if he/she will take the full charge for the call or if the calling party should take the charge or if the calling and palled party should split the charge.

An acknowledgement is sent back to the calling party's User Equipment 1 via S-CSCF 11 in called party's home network and the S-CSCF 9 in the calling party's home network including the dynamic tariff list with the preferences from the called party.

The calling party can then decide if he/she would like to set-up the call/session or reject it depending on the tariff information and the called party's preferences in the dynamic tariff list.

The calling party's User Equipment 1 will then send the dynamic tariff list with both the calling and called preferences to the different charging systems in the normal call/session establishment signalling. The charging system 10 in the calling party's home network will get the tariffs to be used for the calling party and the called party's tariff will be sent from the charging system 12 in the called party's home network.

After this both User Equipment 1, 15 will establish the media streams needed for the IP Multimedia session with the access networks 2, 14.

Charging for both parties will then be started with the charging systems 10, 12 accounting to the tariff to be used according to previous call/session set-up signaling.

The called party may be registered in several locations. Based on the locations of the called party, the S-CSCF can determine for each currently used access type (e.g. WCDMA, ADSL, fix line) what the operator's tariffs are for different kinds of media and media formats would be.

If the called subscriber has previously agreed to pay the access charges for incoming calls, the added tariff, on the calling subscribers total tariff, is zero. In this case additionally an indication that the calling party's access charges are paid by the called party may be included in the response. The S-CSCF builds a dynamic tariff list where the call/session tariff per time/volume unit is included per access and media type during specific time periods.

SIP proxies on the way to the originating end of the session may add the tariffs for the different call legs (e.g terminating leg, operator to operator leg, originating leg) to the tariff list. I.e. the charges for the different call legs are added. Here, the previously mentioned indication that the called party pays can be used to set the costs to zero along the way. When the terminal receives the tariff list, a number of tariff options are shown on the display. The user is prompted to select one or several of these options.

Roaming is also covered by the solution described above, since the access charges in this case will be paid by the called user him/herself.

The user preference can also be specified in the user profile at the user's network. In this case the networks can handle most activities in the call setup procedure.

Figure 4:
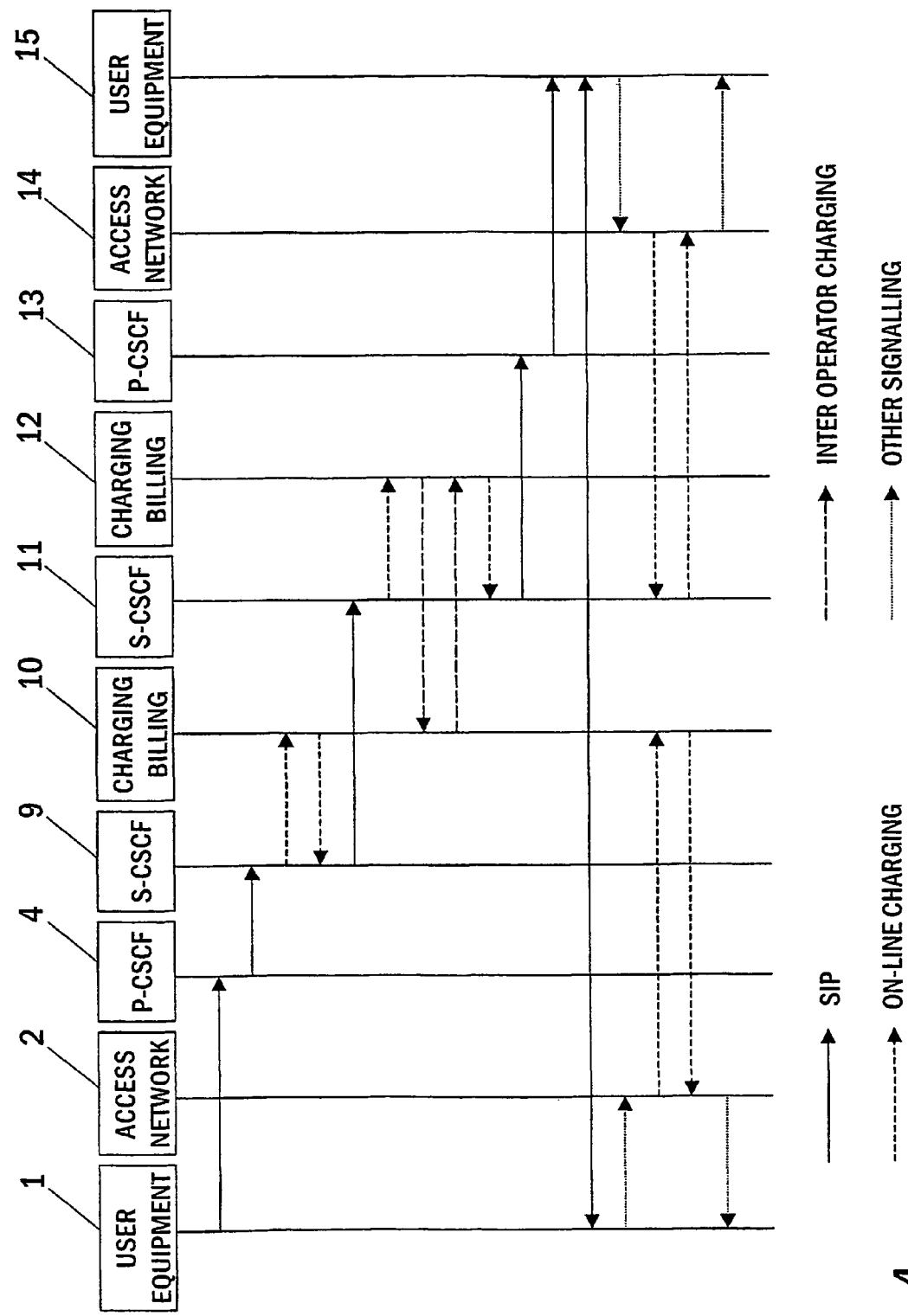
FIG. 4 illustrates a third message sequence utilizing yet another non-limiting example method for charging in a communication network according to the present invention.

FIG. 4 illustrates an example call/session set-up in an IP Multimedia network. In the communication network charging system, the User Equipment 1 asks service information in order to initiate a call to another user. This request from the User Equipment 1 is forwarded through an access network 2, e.g., a GPRS Network 2 or a WLAN Network 2, to an IP Multimedia network e.g. to IMS (IMS, IP-based multimedia sub-system. IMS receives the service information request in a Proxy-CSCF (P-CSCF) 4, which further forwards the request to a Serving-CSCF (S-CSCF) 5.

In the IP Multimedia network, the Serving-CSCF (S-CSCF) 9 performs charging negotiation with the Charging Server 10. At this time of the call/session set-up the Charging Server 10 will not know which tariff to use for the calling party so the call/session set-up will continue. S-CSCF 9 asks the relevant location information of the called user from a Domain Name Server or similar.

When the Serving-CSCF 9 in the calling party's network gets an INVITE, it performs charging with the charging server 10. This is too early in the call/session set-up to determine the tariff so charging server 10 will reply continue.

The S-CSCF 9 in the calling party's home network will forward the call/session Set-up request to the S-CSCF 11 in the called party's home network on the information gotten from the Domain Name Server. The S-CSCF 11 in the called party's home network will perform charging with the charging server 12.

The charging server 12 in the called party's network will then contact the charging server 10 in the calling party's network and negotiate, according to the different parties preferences, the tariffs to be used for both calling and palled party. Like in a normal GSM call the calling party will be charged for the full call (both originating and terminating leg). In a free phone case the called party will be charged for the full call/session.

When the Serving-CSCF 9 in the called party's gets the INVITE, it performs charging with the charging server 10. The charging server 10 will then negotiate the tariffs used for the different parties with the calling party's charging server 12. Tariffs to he used are determined on the charging preferences the parties have. In a normal case, calling party will be charged for the whole call/session or in a free-phone case, the called party will be charged for the call/session. There are also possibilities that the charge could be split between calling and called party.

Both the Charging servers 10, 12 will know whether their user is roaming and can also be handled in the negotiation. The call/session set-up request will be sent to the called party's User Equipment 15 via the P-CSCF 13.

The call/session set-up procedure will continue in a normal way and both charging systems 10, 12 will know how to charge the different parties.

After this both User Equipment 1, 15 will establish the media streams needed for the IP Multimedia session with the access networks 2, 14. Charging for both parties will then be started with the charging systems 10, 12 accounting to the tariff to be used according to previous call/session set-up signaling.

In the non-limiting communication network charging solutions, both calling and called user can be normal subscribers and not roaming, or only the calling party can be roaming. Charging system in the called network contacts Charging system in the calling network to say that the calling party should be charged for the call and here is the tariff Charging system in the calling network sends back OK acknowledgement.

In a Free phone application, it can also be that the charging system in the called network contacts charging system in the calling network and confirms that called party will take the charging for both originating and terminating legs and provide the tariff for the originating leg. Charging system in the calling network sends back the tariff for originating leg.

In an application where the called party is roaming, the charging system in the called network contacts the charging system in the calling network and confirms that the called party is roaming so called party will pay for the terminating leg. The calling network replies with OK acknowledgement and be calling party will be charged for the originating leg.

Settlement between the involved operators is handled based on CDRs (CDR, Call Detail Record). Also post-paid billing is handled based on the CDRs. In case the calling party is a prepaid subscriber, the S-CSCF of the calling party may send information to the prepaid system. This information would among other data contain information received from the called party's S-CSCF in the tariff list.

In case the called party uses a more expensive bearer for the media than necessary, the called party can be charged for the difference in the tariff between the used bearer, and the bearer the calling party has agreed to pay. A prerequisite for the prepaid charging to work is also that information about the used access type is conveyed to the calling party's S-CSCF.

The non-limiting example charging system has functionality to rate and charge a call/session either on tariffs stored in the charging system or on tariffs provide by the Serving-CSCF. The charging system can also determine the tariff for the access types that can be used by the User Equipments. Furthermore, charging system can communicate with a charging system in another network an negotiate the tariffs to be used according to the different parties preferences.

The example solutions allow charging principles used in traditional telecom networks to be applied also in IP Multimedia networks. The solutions allow dynamic sending per session from the called party's network to the calling party of a tariff list containing different alternatives how to route a session.

The solutions allow the calling party to route a session to a certain access type based on an access type indicator, received from the called party's network as part of the tariff list. The solutions allow using the tariff list to handle prepaid charging in the calling party's network.

The operators have strongly indicated that they want to follow charging principles currently known by their customers, when charging for IP Multimedia services. Due to the network architecture and technology used in an IP Multimedia network, it will not be a trivial task. So far, no solutions have been publicly presented.

The invention claimed is:

1. A system for charging in an IP communication network, the IP communication network comprising:
   a user equipment;
   an IP Multimedia subsystem, said IP Multimedia subsystem including:
   a Proxy-CSCF;
   a calling user's home network Serving-CSCF;
   a called user's home network Serving-CSCF,
   a location server;
   a charging server wherein the calling user's home network Serving-CSCF is arranged for
   receiving a call/session set-up request message,
   forwarding the call/session set-up request message to the called user's home network Serving-CSCF,
   asking the relevant location information of the called user from the Location Server,
   asking tariff information for the called user in the relevant locations from a Charging Server,
   creating a dynamic tariff list,
   sending the dynamic tariff list to a calling party user equipment, and
   sending the dynamic tariff list to a called party user equipment, and wherein the calling party user equipment is arranged for
   receiving the dynamic tariff list,
   displaying the dynamic tariff list to the calling user,
   detecting selections of the calling user, and
   sending the call/session set-up request message for setting up an IP Multimedia call/session.

2. A charging system according to claim 1, wherein the call/session set-up request message of the calling party user equipment is made by sending an INVITE message.

3. A charging system according to claim 1, wherein the call/session set-up request message of the calling party user equipment is made by using an OPTIONS method.

4. A charging system according to claim 1, wherein the called party user equipment is arranged for receiving the dynamic tariff list.

5. A charging system according to claim 4, wherein the called party user equipment is arranged for displaying the dynamic tariff list to the user.

6. A charging system according to claim 4, wherein the called party user equipment is arranged for detecting selections of the called user.

7. A charging system according to claim 4, wherein a cost of the call/session is divided between the calling party and the called party.

8. A charging system according to claim 4, wherein the called party user equipment is arranged for sending a response to the calling party user equipment.

9. A charging system according to claim 1, wherein the called user's home network Serving-CSCF is arranged for negotiating the tariff with the calling user's home network Serving-CSCF.

10. A charging system according to claim 9, wherein a cost of the call/session is divided between the calling party and the called party.

11. A charging system according to claim 9, wherein the Serving-CSCF is arranged for sending a response to the calling party user equipment and to the called party user equipment.

12. A charging system according to claim 1, wherein the calling party user equipment is arranged for sending a new invite message to the network, wherein the chosen access type and/or media type is included in the message.

13. A charging system according to claim 1, wherein the called user's home network Serving-CSCF is arranged for
   receiving a second connection set up request towards said called subscriber,
   based upon said second connection set up request determining towards which location to set up the connection, and
   setting up the connection towards said location.

14. A charging system according to claim 1, wherein the location of called user is registered in the location server.

15. A charging system according to claim 13, wherein said second connection set up request also indicates which quality of service, which media type and/or which access type to use.

16. A charging system according to claim 1, wherein the connection set up requests are done using SIP signalling.

17. A charging system according to claim 1, wherein the connection set up requests comprise using SIP INVITE or SIP OPTIONS messages.

18. A charging system according to claim 1, wherein
   the calling user's home network Serving-CSCF is arranged for providing a tariff information for terminating a call from a calling party network to a called party network;

the called user's home network Serving-CSCF is arranged for accepting the tariff in the called party network; and
the calling user's home network Serving-CSCF is arranged for initiating at least one charging session when setting up a connection.

19. A charging system according to claim 18, wherein the settlement between the networks is sent from the calling user's home network Serving-CSCF in the calling party network to a the called user's home network Serving-CSCF in the called party network as a CDR (Call Detail Record).

20. A charging system according to claim 1, wherein
the called user's home network Serving-CSCF is arranged for providing a tariff information for terminating the call from a called party network to a calling party network;
the calling user's home network Serving-CSCF is arranged for accepting the tariff in the calling party network; and
the called user's home network Serving-CSCF is arranged for initiating at least one charging session when setting up a connection.

21. A charging system according to claim 20, wherein the settlement between the networks is sent from the called user's home network Serving-CSCF in the called party network to the calling user's home network Serving-CSCF in the calling party network as a CDR (Call Detail Record).

22. A charging system according to claim 1, wherein the called party user equipment is a mobile telephone, a personal computer, a personal digital assistant, a fixed telephone, or a smart phone.

23. A method for charging in an IP communication network the IP communication network having a user equipment and an IP Multimedia subsystem, said IP Multimedia subsystem having a Proxy-CSCF, a calling user's home network Serving-CSCF, a called user's home network Serving-CSCF, a location server and a charging server, the method comprising:
the calling user's home network Serving-CSCF, receiving a call/session set-up request from the calling party user equipment to the network;
the calling user's home network Serving-CSCF forwarding the call/session set-up request to the called user's home network Serving-CSCF;
the called user's home network Serving-CSCF, checking where the called user is currently registered by asking for relevant location information of the called user from the Location Server;
the calling user's home network Serving-CSCF and the called user's home network Serving-CSCF determining in the network the costs based on each used access types by asking tariff information for the called user in the relevant locations from the Charging Server;
the calling user's home network Serving-CSCF, creating a dynamic tariff list in the network;
the calling user's home network Serving-CSCF, sending the dynamic tariff list to a calling party user equipment;
the calling party user equipment receiving the dynamic tariff list;
the calling party user equipment displaying the dynamic tariff list to the user;
the calling user selecting one or several options for access type and/or media type; and
the called user's home network Serving-CSCF sending the dynamic tariff list to called party user equipment.

24. A charging method according to claim 23, wherein the calling party user equipment sends an SIP invite message as a the call/session set-up request.

25. A charging method according to claim 23, wherein the calling party user equipment uses a SIP options method for requesting the call/session set-up.

26. A charging method according to claim 23, wherein the called party user equipment receives the dynamic tariff list.

27. A charging method according to claim 26, wherein the called party user equipment displays the dynamic tariff list to the user.

28. A charging method according to claim 26, wherein the called party user equipment detects selections of the user.

29. A charging method according to claim 26, wherein a cost of the call/session is divided between the calling party and the called party.

30. A charging method according to any one of claims 26, wherein the called party user equipment sends a response to the calling party user equipment.

31. A charging method according to claim 23, wherein the called user's home network Serving-CSCF negotiates the tariff with the calling user's home network Serving-CSCF.

32. A charging method according to claim 31, wherein a cost of the call/session is divided between the calling party and the called party.

33. A charging method according to claim 31, wherein the Serving-CSCF sends a response to the calling party user equipment and to the called party user equipment.

34. A charging method according to claim 23, wherein the method further comprises sending a new invite message from the calling party user equipment to the network, wherein the chosen access type and/or media type is included in the message.

35. A charging method according to claim 23, wherein after the step of returning to said calling party user equipment said access costs, the method further comprising:
receiving a second connection set up request towards said called user,
based upon said second connection set up request determining towards which location to set up the connection, and
setting up the connection towards said location.

36. A charging method according to claim 23, wherein the location of said called subscriber is registered in the location server.

37. A charging method according to claim 35, wherein said second connection set up request also indicates which quality of service, which media type and/or which access type to use.

38. A charging method according to claim 23, wherein the connection set up requests are done using SIP signalling.

39. A charging method according to claim 23, wherein the connection set up requests comprise using SIP INVITE or SIP OPTIONS messages.

40. A charging method according to claim 23, the method further comprising:
providing a tariff information for terminating the call from a first network to a second network;
accepting the tariff in the second network; and
initiating at least one charging session when the calling party sets up the connection.

41. A charging method according to claim 40, wherein the first network is the called party network and the second network is the calling party network.

42. A charging method according to claim 40, wherein the first network is the calling party network and the second network is the called party network.

43. A charging method according to claim 40, wherein a settlement between the networks is sent from a first operator in the first network to a second operator in the second network as a CDR (Call Detail Record).

44. A system for charging in an IP communication network, the system comprising a calling user home serving CSCF configured to:
- receive a call/session set-up request message from a calling party user equipment;
- forward the call/session set-up request message to a called user home network serving CSCF;
- request relevant location information of a called user from a location server;
- request tariff information for the called user in the relevant locations from a charging server;
- create a dynamic tariff list;
- send the dynamic tariff list to a called party user equipment; and
- send the dynamic tariff list to the calling party user equipment.

45. The system of claim 44, wherein the calling user home serving CSCF is further configured to insert a tariff for an originating leg in the dynamic tariff list sent to the called party user equipment.

46. The system of claim 44, wherein the dynamic tariff list sent to the calling party user equipment includes a preference of the called user regarding whether the called user, a calling user, or both will pay the charge.

47. A system for charging in an IP communication network, the system comprising a calling party user equipment configured to:
- send a call/session set-up request message to a calling user home serving CSCF;
- receive a dynamic tariff list from the calling user home serving CSCF;
- display the dynamic tariff list to a calling user;
- detect selections of the calling user; and
- send a request message for setting up an IP Multimedia call/session,
- wherein the dynamic tariff list includes a preference of a called user regarding whether the called user, a calling user, or both will pay the charge.

48. A system for charging in an IP communication network, the system comprising a called user home serving CSCF configured to:
- receive a call/session set-up request message from a calling user home serving CSCF;
- request tariff information for a called user from a charging server;
- receive a dynamic tariff list from the calling user home serving CSCF and forward the dynamic tariff list to a called party user equipment; and
- receive the dynamic tariff list from the called party user equipment and forward the dynamic tariff list to the calling user home serving CSCF.

49. The system of claim 48, wherein the dynamic tariff list forwarded to the called party user equipment includes a tariff for an originating leg and a tariff for a terminating leg.

50. The system of claim 48, wherein the dynamic tariff list forwarded to the calling user home serving CSCF includes a preference of the called user regarding whether the called user, a calling user, or both will pay the charge.

51. A system for charging in an IP communication network, the system comprising a called party user equipment configured to:
- receive a call/session set-up request message from a called user home serving CSCF;
- receive a dynamic tariff list from the called user home serving CSCF;
- display the dynamic tariff list to a called user;
- detect selections of the called user; and
- send the dynamic tariff list to the called user home serving CSCF,
- wherein the dynamic tariff sent to the called user home serving CSCF list includes a preference of the called user regarding whether the called user, a calling user, or both will pay the charge.

* * * * *

UNITED STATES PATENT AND TRADEMARK OFFICE
CERTIFICATE OF CORRECTION

| | |
|---|---|
| PATENT NO. | : 7,436,942 B2 |
| APPLICATION NO. | : 10/496181 |
| DATED | : October 14, 2008 |
| INVENTOR(S) | : Hakala et al. |

It is certified that error appears in the above-identified patent and that said Letters Patent is hereby corrected as shown below:

In Column 2, Line 29, after "object of" delete "on".

In Column 2, Line 34, delete "system" and insert -- system is --, therefor.

In Column 3, Line 60, delete "method" and insert -- method, --, therefor.

In Column 4, Line 17, delete "of" and insert -- of: --, therefor.

In Column 4, Line 44, after "for each of" delete "at".

In Column 4, Line 52, after "based upon" delete "said".

In Column 4, Line 67, delete "of" and insert -- of: --, therefor.

In Column 5, Line 23, delete "of" and insert -- of a --, therefor.

In Column 5, Line 47, delete "user" and insert -- the user --, therefor.

In Column 5, Line 56, delete "3" and insert -- 3, --, therefor.

In Column 6, Line 7, delete "using the" and insert -- using an --, therefor.

In Column 6, Line 9, delete "6" and insert -- 6, --, therefor.

In Column 6, Line 45, delete "Equipment" and insert -- the User Equipment --, therefor.

In Column 6, Line 47, delete "2" and insert -- 2, --, therefor.

In Column 6, Line 50, delete "sub-system." and insert -- sub-system). --, therefor.

In Column 7, Line 12, delete "palled" and insert -- called --, therefor.

In Column 8, Line 3, delete "sub-system." and insert -- sub-system). --, therefor.

Signed and Sealed this
Fifteenth Day of March, 2011

David J. Kappos
*Director of the United States Patent and Trademark Office*

CERTIFICATE OF CORRECTION (continued)
U.S. Pat. No. 7,436,942 B2

In Column 8, Line 26, delete "palled" and insert -- called --, therefor.

In Column 8, Line 35, delete "he" and insert -- be --, therefor.

In Column 8, Line 59, delete "tariff" and insert -- tariff. --, therefor.

In Column 9, Line 6, delete "be" and insert -- the --, therefor.

In Column 9, Line 22, delete "provide" and insert -- provided --, therefor.

In Column 9, Line 26, delete "an" and insert -- and --, therefor.

In Column 9, Line 54, in Claim 1, delete "Serving-CSCF," and insert -- Serving-CSCF; --, therefor.

In Column 10, Line 64, in Claim 18, delete "wherein" and insert -- wherein: --, therefor.

In Column 11, Line 9, in Claim 19, after "work to" delete "a".

In Column 11, Line 11, in Claim 20, delete "wherein" and insert -- wherein: --, therefor.

In Column 11, Lines 30-31, in Claim 23, delete "network" and insert -- network, --, therefor.

In Column 11, Line 66, in Claim 24, delete "an SIP" and insert -- a SIP --, therefor.

In Column 11, Line 66, in Claim 24, after "message as" delete "a".

In Column 12, Line 14, in Claim 30, delete "any one of claims" and insert -- claim --, therefor.

In Column 14, Line 33, in Claim 51, after "dynamic tariff", insert -- list --.

In Column 14, Line 34, in Claim 51, after "CSCF" delete "list".